(12) United States Patent
Frenkiel

(10) Patent No.: US 9,043,758 B2
(45) Date of Patent: May 26, 2015

(54) SYSTEM FOR GENERATING READABLE AND MEANINGFUL DESCRIPTIONS OF STREAM PROCESSING SOURCE CODE

(71) Applicant: International Business Machines Corporation, Armonk, NY (US)

(72) Inventor: Andy L. Frenkiel, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 13/839,289

(22) Filed: Mar. 15, 2013

(65) Prior Publication Data

US 2014/0282403 A1 Sep. 18, 2014

(51) Int. Cl.
*G06F 9/44* (2006.01)

(52) U.S. Cl.
CPC ........................................ *G06F 8/73* (2013.01)

(58) Field of Classification Search
CPC .......................................................... G06F 8/73
USPC .......................................................... 717/123
See application file for complete search history.

(56) References Cited

U.S. PATENT DOCUMENTS

| | | | |
|---|---|---|---|
| 4,860,203 A | 8/1989 | Corrigan et al. | |
| 6,389,481 B1 | 5/2002 | Malcolm | |
| 6,438,512 B1 | 8/2002 | Miller | |
| 6,951,010 B2 * | 9/2005 | Sasaki | 717/123 |
| 6,965,990 B2 | 11/2005 | Barsness et al. | |
| 7,188,336 B2 * | 3/2007 | Humphries | 717/123 |
| 7,292,961 B2 | 11/2007 | Dias et al. | |
| 7,509,632 B2 | 3/2009 | Boger | |
| 7,653,898 B1 | 1/2010 | Ali et al. | |
| 7,703,075 B2 * | 4/2010 | Das et al. | 717/123 |
| 7,788,640 B2 | 8/2010 | Grimaldi | |
| 7,860,836 B1 | 12/2010 | Natanzon et al. | |
| 8,122,006 B2 | 2/2012 | de Castro Alves et al. | |
| 8,126,825 B2 | 2/2012 | Guyon | |
| 8,132,154 B2 | 3/2012 | Bank et al. | |
| 8,225,274 B2 | 7/2012 | Cowtan | |
| 8,250,536 B2 | 8/2012 | Woods | |
| 8,261,237 B2 | 9/2012 | Zeidman | |
| 8,434,067 B2 | 4/2013 | Nagabhushan et al. | |

(Continued)

OTHER PUBLICATIONS

Non-Final Office Action dated May 7, 2014 received for U.S. Appl. No. 13/761,602.
Fitch, B.G., et al., "Blue Matter, An Application Framework for Molecular Simulation on Blue Gene," IBM Research Report RC22683, May 29, 2003, pp. 1-41.
Waldbusser, S., "Application Performance Measurement MIB," Network Working Group RFC 3729, Mar. 2004, pp. 1-62.
Deville, R.A., et al., "Performance Monitoring for Run-Time Management of Reconfigurable Devices," In Engineering of Reconfigurable Systems and Algorithms (ERSA) Jun. 2005, pp. 1-7.
Gopisetty, S., et al., "Evolution of Storage Management: Transforming Raw Data into Information," IBM J. Res. & Dev. Vol. 52, No. 4/5, Jul./Sep. 2008, pp. 1-12.
Li, J., et al., "A Runtime and Analysis Framework Support for Unit Component Testing in Distributed Systems," Proceedings of the 40th Hawaii International Conference on System Sciences, Jan. 2007, pp. 1-10.

*Primary Examiner* — Philip Wang
(74) *Attorney, Agent, or Firm* — Fleit Gibbons Gutman Bongini & Bianco PL; Jose Gutman

(57) ABSTRACT

An information processing system, computer readable storage medium, and method for automatically generating human readable and meaningful documentation for one or more source code files. A processor of the information processing system receives one or more source code files containing source code artifacts (SCA) and infers semantics therefrom based on predefined rules. The processor, based on the inferred semantics, extracts documentation from another source code file. The extracted documentation and the inferred semantics are used to generate new human readable and meaningful documentation for the SCA, such new documentation being previously missing from the SCA. The generated new documentation is included with the SCA in one or more source code files.

24 Claims, 12 Drawing Sheets

(56) References Cited

U.S. PATENT DOCUMENTS

| | | |
|---|---|---|
| 2004/0186817 A1* | 9/2004 | Thames et al. .................... 707/1 |
| 2006/0064687 A1 | 3/2006 | Dostert |
| 2008/0148235 A1 | 6/2008 | Foresti et al. |
| 2009/0210861 A1* | 8/2009 | Alupului ....................... 717/123 |
| 2009/0278937 A1 | 11/2009 | Botchen et al. |
| 2011/0197097 A1 | 8/2011 | Beaty et al. |
| 2011/0258216 A1 | 10/2011 | Supakkul et al. |
| 2011/0307828 A1 | 12/2011 | Chilimbi et al. |
| 2013/0246995 A1 | 9/2013 | Ferrao et al. |

\* cited by examiner

114

- Stream Language Rules
  202

- Operator Properties Files Rules
  204

- Application Pattern Specification Rules
  206

- Matching Compatible Input and Outputs
  208

- Function Invocations and Function Defs.
  210

- Object Reference and Object Defs.
  212

- Class References and Class Defs.
  214

- Token Names
  216

```
composite TradeAggregator {
  graph
    stream<TQRecT> TradeQuote = Import() {
      param streamId "Todays_Trades";
    }
    stream<TradeFilterT> TradeFilter = Functor(TradeQuote) {
      param
        filter : isTrade(ttype) && (ticker in $monitoredTickers);
      output
        TradeFilter : ts = timeStringToTimestamp(date, time, false);
    }
    stream<QuoteFilterT> QuoteFilter = Functor(TradeQuote) {
      param
        filter : isQuote(ttype) && (ticker in $monitoredTickers);
      output
        QuoteFilter : ts = timeStringToTimestamp(date, time, false);
    }
    stream<PreVwapT> PreVwap = Aggregate(TradeFilter) {
      window
        TradeFilter : sliding, count(4), count(1), partitioned;
      param
        partitionBy : ticker;
      output
        PreVwap : ticker = Any(ticker), vwap = Sum(price * volume), minprice = Min(price),
          maxprice = Max(price), avgprice = Average(price), sumvolume = Sum(volume);
    }
    () as EQsuoteFilter Export(QuoteFilter) {
      param streamId : "Todays_Quotes";
    }
    () as EPreVwap = Export(PreVwap) {
      param streamId : "Todays_AggTrades";
    }
}
```

502 type
/** A transaction record that represents an ask or bid. The ttype field
   indicates the transaction type.
*/
TQRecT = rstring ticker, rstring date, rstring time, int32 gmtOffset,
        rstring ttype, rstring exCntrbID, decimal64 price,
        decimal64 volume, decimal64 vwap, rstring buyerID ...

/**
@section overview
Source program that produces bid and ask transactions for multiple tickers.

@export TradeQuote today's trades
*/                                              504
composite TradeInput {
    graph
     stream<TQRecT> TradeQuote = FileSource() {
       param
         file : "Trades_20120906.csv.gz";
         format : csv;
         compression : gzip;
       }

() as E = Export(TradeQuote) {
       param streamId "Todays_Trades";
     }
}

```
type
  VwapT = rstring ticker, decimal64 minprice, decimal64 maxprice,
          decimal64 avgprice, decimal64 vwap;

/** Contains weighted volume, and vwap fields                    ⟵ 602
 */
PreVwapT = VwapT, tuple<decimal64 sumvolume>;

/**
 @import PreVwap raw aggregated trade information                ⟵ 604
 @export EVwap average of weighted volume
 */
composite ComputeAvgs {
  graph
    stream<PreVwapT> PreVwap = Import() {
      param streamId : "Todays_AggTrades";
    } stream<VwapT> Vwap = Functor(PreVwap) {
      output
        Vwap : vwap = vwap / sumvolume;
    }

() as EVwap = Export(Vwap) {
      param streamId : "Vwap";
    }
}
```

FIG. 6

```
/**
 @import TradeQuote today's trades.
 TradeQuote is of type TQRect, which is describes as "A transaction record that represents
 an ask or bid. The ttype field indicates the transaction type.
 Example data is formatted as CSV: (AEC,27-DEC-2005,06:16:53.068,-5,Trade,,,,,,,,,,,,7.61,,,,,)

@export QuoteFilter

@export PreVwap average of weighted volume.
 PreVwap is of type PreVwapT which is described as "Contains weighted volume, and vwap fields".
*/
composite TradeAggregator {
  graph
    stream<TQRecT> TradeQuote = Import() {
      param streamId "Todays_Trades";
    }
    stream<TradeFilterT> TradeFilter = Functor(TradeQuote) {
      param
        filter : isTrade(ttype) && (ticker in $monitoredTickers);
      output
        TradeFilter : ts = timeStringToTimestamp(date, time, false);
    }
    stream<QuoteFilterT> QuoteFilter = Functor(TradeQuote) {
      param
        filter : isQuote(ttype) && (ticker in $monitoredTickers);
      output
        QuoteFilter : ts = timeStringToTimestamp(date, time, false);
    }
    stream<PreVwapT> PreVwap = Aggregate(TradeFilter) {
      window
        TradeFilter : sliding, count(4), count(1), partitioned;
      param
        partitionBy : ticker;
      output
        PreVwap : ticker = Any(ticker), vwap = Sum(price * volume), minprice = Min(price),
          maxprice = Max(price), avgprice = Average(price), sumvolume = Sum(volume);
    }
    () as EQsuoteFilter Export(QuoteFilter) {
      param streamId : "Todays_Quotes";
    }
    () as EPreVwap = Export(PreVwap) {
      param streamId : "Todays_AggTrades";
    }
}
```

702 — Derived from TradeInput
704 — Not described - no information
706 — Derived from ComputeAvgs

```
/**
@import Vwap contains volume weighted average price for ticker
@import QuoteFilter contains asks for ticker
@export BargainIndex rating of bargain                      ~902
*/ composite FindBargain {
    graph
      stream<VwapT> Vwap = Import() {
        param streamId : "Vwap";
      }
      stream<QuoteFilterT> = Import() {
          param streamId : "Todays_AggTrades";
        }
      stream<BargainIndexT> BargainIndex = Join(Vwap as V; QuoteFilter as Q) {
      window
        V : sliding, count(1), partitioned;
        Q : sliding, count(0);
      param
        partitionByLHS : V.ticker;
        equalityLHS    : V.ticker;
        equalityRHS    : Q.ticker;
      output
        BargainIndex : index = vwap > askprice ? asksize * exp(vwap - askprice) : 0d,
            ts = (rstring) ctime(ts);
      }
      () as EBargainIndex = Export(BargainIndex) {
        Param streamId: "BargainRating";
      }
}
```

FIG. 9

```
/**
@import TradeQuote today's trades.
TradeQuote is of type TQRect, which is describes as "A transaction record that represents
an ask or bid. The ttype field indicates the transaction type.
Example data is formatted as CSV: (AEC,27-DEC-2005,06:16:53.068,-5,Trade,,,,,,,,,,,,,,,7.61,,,,,)
@export QuoteFilter contains asks for ticker      ~1002
@export PreVwap average of weighted volume.
PreVwap is of type PreVwapT which is described as "Contains weighted volume, and vwap fields".
*/
composite TradeAggregator {                                    Derived from FindBargain
    graph
      stream<TQRecT> TradeQuote = Import() {
        param streamId "Todays_Trades";
      }
      stream<TradeFilterT> TradeFilter = Functor(TradeQuote) {
        param
          filter : isTrade(ttype) && (ticker in $monitoredTickers);
        output
          TradeFilter : ts = timeStringToTimestamp(date, time, false);
      }
      stream<QuoteFilterT> QuoteFilter = Functor(TradeQuote) {
        param
          filter : isQuote(ttype) && (ticker in $monitoredTickers);
        output
          QuoteFilter : ts = timeStringToTimestamp(date, time, false);
      }
      stream<PreVwapT> PreVwap = Aggregate(TradeFilter) {
      window
        TradeFilter : sliding, count(4), count(1), partitioned;
      param
        partitionBy : ticker;
      output
        PreVwap : ticker = Any(ticker), vwap = Sum(price * volume), minprice = Min(price),
           maxprice = Max(price), avgprice = Average(price), sumvolume = Sum(volume);
      }
      () as EQsuoteFilter Export(QuoteFilter) {
        param streamId : "Todays_Quotes";
      }
      () as EPreVwap = Export(PreVwap) {
        param streamId : "Todays_AggTrades";
      }
}
```

FIG. 10

SYSTEM FOR GENERATING READABLE AND MEANINGFUL DESCRIPTIONS OF STREAM PROCESSING SOURCE CODE

STATEMENT REGARDING FEDERALLY SPONSORED RESEARCH OR DEVELOPMENT

This invention was made with Government support under Contract No.: H98230-11-C-0276 awarded by Department of Defense. The Government has certain rights in this invention.

BACKGROUND

The present disclosure generally relates to systems for generating documentation for source code, and more particularly relates to an information processing system that automatically generates human readable and meaningful documentation for one or more related source code files.

Understanding design structure, features, and function, and the associated run time behavior, of sparsely, if at all, documented applications can be very challenging. This is mainly due to the lack of human readable and meaningful documentation that describes the source code of such applications. These types of descriptions of the source code artifacts (SCA) are typically included in source code artifact (SCA) documentation. Users, programmers, and system administration personnel, all have varying degrees of need to read such comments to help them understand the design structure and function, and the associated run time behavior, of such applications.

The current art is exemplified by Javadoc and Doxygen, which generate documents for Java and C++ source code, respectively. These tools generate HTML documents that structure and format descriptive text embodied in comments in the source code. The comments are authored by computer programmers while developing the code. In practice, much of the source code produced, even for commercial products, lacks comments or contains comments that are insufficient with respect to detail or accuracy. Even when comments are provided, they often become inaccurate when the source code is subsequently modified.

This lack of user readable and meaningful comments associated with applications is a particularly pernicious problem for long running applications with strong run-time dynamics with a continuing need to capture and maintain such comments describing the history of changes in source code and runtime behavior that happen during the execution of the application. Furthermore, significant changes in the runtime behavior, such as variations in the application topology, workload, or runtime state and metrics, can be difficult to digest by a human operator without such user readable and meaningful documentation and comments.

This lack of source code artifacts documentation results in source code which typically consists of lists of classes and method names, but is otherwise lacking in meaningful or accurate descriptions. Other programmers, system administrators, IT managers, or customers who intend to use or understand the code need to resort to inferring the structure, features, and function by guessing and experimenting, reading the source code, if available, or referring to help resources such as forums and the vendor's help desk.

While the size and complexity of applications continues to increase, the importance of user readable and meaningful comments associated with the source code artifacts of such applications becomes more important. Unfortunately, conventional information processing systems have not kept up with this increasing need for generating user readable and meaningful documentation for source code modules.

BRIEF SUMMARY

In one embodiment, a method with an information processing system is disclosed. The method includes receiving one or more source code files containing at least source code artifacts (first SCA); inferring semantics, with a processor of an information processing system, from at least the first SCA based on predefined rules, the inferred semantics at least indicating description of at least one of structure, function, and features, of the first SCA; automatically generating, with the processor and based at least on the inferred semantics, new human readable and meaningful documentation as new SCA documentation that describes at least one of structure, function, and features of the first SCA, and that such new SCA documentation is previously missing from the first SCA and any associated SCA documentation; and storing the generated new human readable and meaningful documentation associated with the first SCA as SCA documentation for the first SCA.

In another embodiment, an information processing system includes memory; a rules repository for storing predefined rules relating to at least one of structure, function, and features, of a set of source code artifacts; and a processor communicatively coupled to the memory and the rules repository, wherein the processor, responsive to executing computer instructions, performs operations comprising: receiving one or more source code files containing at least source code artifacts (first SCA); inferring semantics, with the processor, from at least the first SCA based on the predefined rules, the inferred semantics at least indicating description of at least one of structure, function, and features, of the first SCA; automatically generating, with the processor and based at least on the inferred semantics, new human readable and meaningful documentation as new SCA documentation that describes at least one of structure, function, and features of the first SCA, and that such new SCA documentation is previously missing from the first SCA and any associated SCA documentation; and storing the generated new human readable and meaningful documentation associated with the first SCA as SCA documentation included with the first SCA in one or more source code files.

In yet another embodiment, a computer readable storage medium, includes computer instructions which, responsive to being executed by a processor, cause the processor to perform operations comprising: receiving one or more source code files containing at least source code artifacts (first SCA); inferring semantics, with a processor of an information processing system, from at least the first SCA based on predefined rules, the inferred semantics at least indicating description of at least one of structure, function, and features, of the first SCA; automatically generating, with the processor and based at least on the inferred semantics, new human readable and meaningful documentation as new SCA documentation that describes at least one of structure, function, and features of the first SCA, and that such new SCA documentation is previously missing from the first SCA and any associated SCA documentation; and storing the generated new human readable and meaningful documentation associated with the first SCA as SCA documentation for the first SCA.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 2 is a block diagram illustrating an example of a rules repository used by the information processing system of FIG. 1;

FIG. 3 is an example program listing illustrating a source code module that is a portion of an application source code with sparse, if any, comments;

FIGS. 5 and 6 are two example program listings of the two source code modules that include comments as shown in FIG. 4;

FIG. 7 is a program listing illustrating the source code module of FIG. 3 being updated to include comments harvested, derived, and extracted, from the other two related source code modules that include comments as shown in FIG. 4;

FIG. 9 is an example program listing of the newly added source code module that includes comments as shown in FIG. 8;

FIG. 10 is a program listing illustrating the source code module of FIG. 3 being updated to include comments harvested, derived, and extracted, from the newly added related source code module that includes comments as shown in FIG. 8;

DETAILED DESCRIPTION

Figure 1:
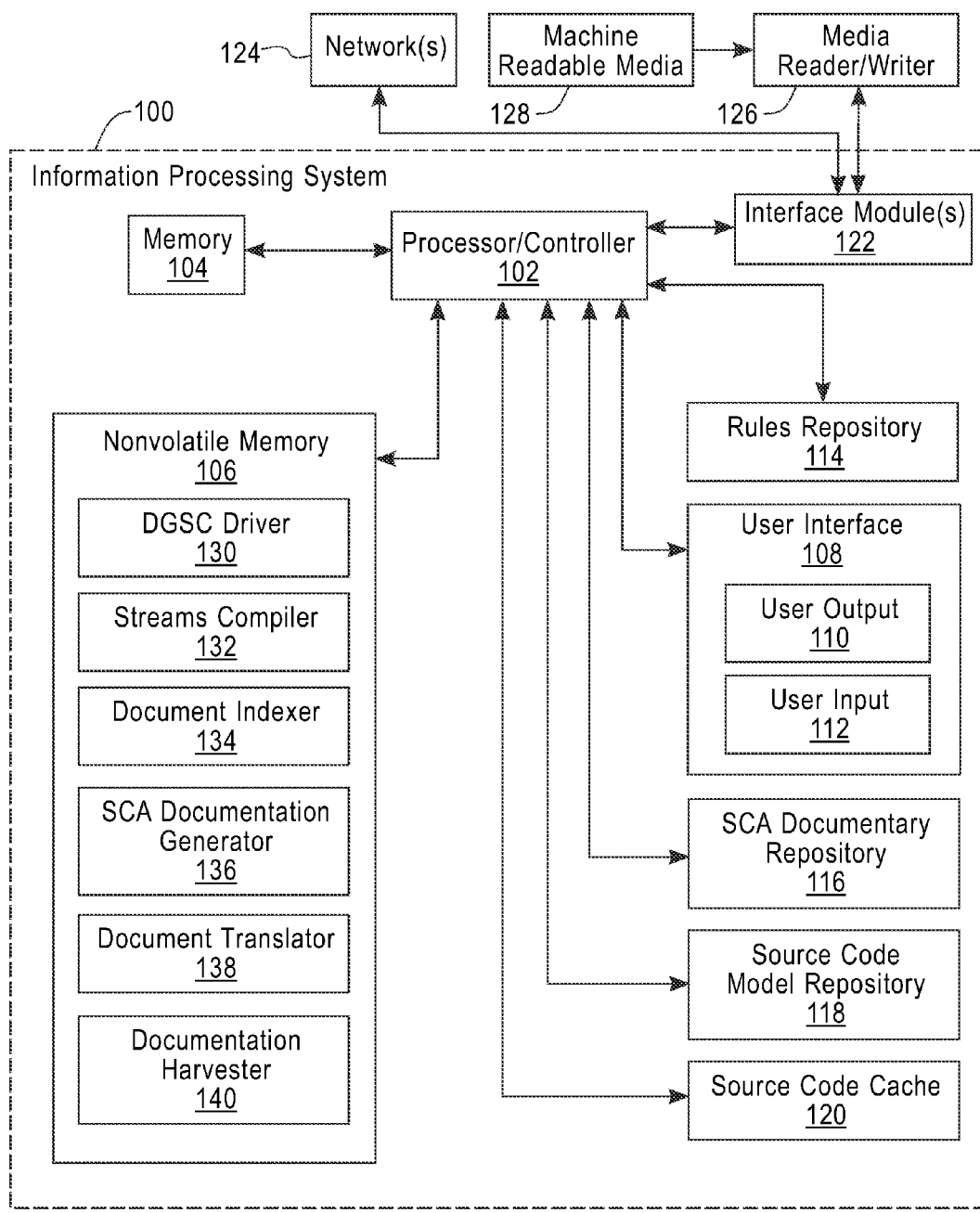
FIG. 1 is a block diagram illustrating an example of an information processing system, according to one embodiment of the present disclosure.

This invention, according to various embodiments, automatically generates meaningful and readable descriptions of streams processing source code structure, features, and functions. The generated descriptions are used by computer programmers, system administrators, IT managers, customers, among others, to understand how to use, execute and modify the streams processing code. The generated text and documentation, according to one example, may be used in lieu of comments, if any, provided by the programmer, or as a set of initial text descriptions that the programmer would subsequently elaborate or extend.

Streams processing applications consist of a set of operators and streams that connect the operators. The streams are a communication channel on which a set of data messages, often called tuples, transit. The operators take as input zero or more data streams and output zero or more streams. The operators transform the messages on the input data stream to the output stream by modifying, enhancing, combining, filtering, and synchronizing the input tuples to yield output tuples. The source code for a streams processing application identifies and parameterizes the operators, and describes how the operators are connected to one another. The streams processing source code is specified in a computer programming language such as IBM's InfoSphere Streams Processing Language, SPL. Like Java or C++, streams processing languages may include the capability of specifying text comments that describe language components such as stream schema, operators, functions, and so on. In addition to streams source code, the developer may author related source code artifacts (SCA) that specify the properties of reusable stream operators. These artifacts may be specified using a structured document format, such as XML, and may contain comments that describe the operator's properties.

One embodiment of the present invention consists of one or more software utilities that comprise a Document Generator for Streams Code (DGSC) information processing system. The DGSC information processing system takes as input one or more streams source code modules, as well as various meta data about the streams operators and coding patterns, and produces (generates) a set of human readable and meaningful documentation describing the source code. An embodiment of the invention may produce the documentation in various formats, including HTML, PDF, or ASCII text. The generated documentation may include a combination of text authored by the programmer and text generated by the DGSC information processing system.

To generate text, the DGSC information processing system translates the streams source code to an abstract and detailed model of the code. This source code model captures the key language features of the streams source code including the set of operators, the connections between operators, the schema of the stream connections, and comments, if any, provided by the programmer.

The DGSC information processing system parses the source code model, identifies source code features and functions not documented by the programmer, and using meta data associated with the streams source code in conjunction with a predefined set of rules, generates text that describes the source code. For example, given a specification of an operator where the programmer did not provide a comment that describes the input ports, the DGSC information processing system would extract the input port properties from the source code model and produce text such as: "This operator is configured with two input ports and one output port."

As another example, the DGSC information processing system, from at least the given specification of the operator where the programmer did not provide comments and possibly from other meta data and other source code files maintained by the system, could identify other source code modules that include operators related to the given specification of the operator by compatible streams connections (inputs or output). Relevant comments included with any one or more of the related operators in the other source code modules could be acquired (e.g., harvested, derived, and extracted) and then combined and merged into the specification of the given operator. This adds human readable and meaningful comments to the given specification of the operator to describe the operator. Various embodiments of the present invention are distinguished from existing source code document generators in that any one of these embodiments is capable of automatically generating human readable and meaningful documentation, and with relevant descriptions of the source code module that were previously missing.

On the other hand, existing technologies, such as Javadoc and Doxygen, take as input Java or C++ code, respectively, and generate a set of structured documents in HTML that include and format text merely provided by the application developer. Current documentation tools like JavaDoc and Doxygen don't generate semantic content (e.g. text) or update source code with derived comments harvested from other source code files. Currently, many APIs are never documented. Much of Javadoc (and SPL) code has no text descriptions. Additionally, source code documentation is often not accurate. The documentation is out of synchronization with related source code. The documentation, unfortunately, is often not maintained to keep current description of evolving structures, features, and functions, of the program code. Incorrect documentation impedes understanding of APIs, and imposes a serious service burden on users, programmers, and administrative personnel.

In stark contrast, various embodiments of the present invention can generate meaningful text to describe both the general and specific features and functions of related source code modules, such as of streams processing application code. In one embodiment, an information processing system would incorporate and/or supplement text authored by the streams application developer with generated text that describes features and functions of the application code not documented by the programmer/developer. As much source code has not been documented in the past, a principle value of the present invention is that it provides meaningful explanation of source code that would otherwise remain unexplained. A related benefit is that an initial text description of program code may be automatically provided by a system and then the programmer/developer could subsequently elaborate or extend such initial description. This would help reduce the documentation creation burden on software developers.

With reference to FIG. 1, one embodiment of the present invention includes a Document Generator for Streams Code (DGSC) information processing system 100 that combines several software components, as will be discussed below.

1) A streams compiler 132 takes the streams source code, and other various metadata about the Streams operators and coding patterns, as input and produces a model of the source code. The source code model is represented as an XML document.

2) A documentation generator 136 automatically analyzes at least the streams source code and generates an abstract document from the source code model. This documentation includes meaningful text description for streams source code features and functions associated with a source code artifact (SCA). In an example implementation, the abstract document is represented using the Darwin Information Typing Architecture (DITA) standard. That is, the abstract document is stored and maintained as a DITA document.

3) A documentation harvester 140 can acquire (e.g., harvest, derive, and extract) documentation and comments from other source code artifact modules that may be related to the present SCA module. The harvested, derived, and extracted documentation and comments can be combined and merged into the SCA documentation of the current SCA model being processed. The SCA documentation can be stored and maintained as a DITA document.

4) A document translator translates the DITA document to a format that may be read by a user, such as HTML or PDF.

4) A DGSC driver 130 manages the overall work and data flow across the above identified software components. The operation of the driver 130 and the information processing system 100, according to one example, will be described in more detail below.

In one embodiment of the invention, the programmer authored and generated text are combined in documents by the DGSC information processing system 100 using the following process steps.

1. A user invokes the DGSC driver 130 passing the stream source code as input.

2. The DGSC driver 130 invokes the streams compiler 132, which produces a model of the source code in a file.

3. The DGSC driver 130 invokes the documentation generator 136 passing the source code model as input. The documentation generator 136 also may receive files that describe the properties of stream operators and stream application patterns as input.

4. The documentation generator 136 parses the source code model and operator properties files to identify code features in the source code model that are missing comments. Using predefined rules about, among other things, the stream language, the operator properties files, and application pattern specifications, the documentation generator 136 constructs sentences that describe the undocumented source code. The documentation generator 136 outputs the constructed text along with the programmer authored text to a set of DITA documents.

5. The DGSC driver 130, according to the present example, invokes the document translator 138 passing the DITA documents and target format (e.g. HTML) as input.

6. The document translator 138 outputs a set of documents in the target format that are readable and meaningful to the user.

FIG. 1 shows one example of an operating environment for an information processing system 100, which is applicable to various embodiments of the present disclosure. While the term application is used throughout this disclosure, it should be understood that an application can also broadly mean any portion of an application, including, but not limited to, any method, procedure, function, operator, element, or component, of an application. Additionally, while the singular term application may be used in the present discussion, the plural and singular of the term "application" are interchangeable and equally apply where appropriate. That is, according to various embodiments, documentation can be contemporaneously generated for each of one or more applications being processed by an information processing system.

The information processing system 100 of FIG. 1 can automatically generate meaningful documentation for one or more source code files, according to various embodiments of the present invention. A processor/controller 102 is communicatively coupled with memory 104 and with non-volatile memory 106. The non-volatile memory 106 can be used to store program, data, and configuration parameters, in persistent memory.

The processor/controller 102 is communicatively coupled with a user interface 108 which includes a user output interface 110 and a user input interface 112. The user interface 108 provides the user input interface 112 for receiving user input communication from a user of the information processing system 100 and the user output interface 110 for providing communication to a user of the information processing system 100.

The user output interface 110 may include one or more display devices to display information to a user of the system 100. A display device (not shown) can include a monochrome or color Liquid Crystal Display (LCD), Organic Light Emitting Diode (OLED) or other suitable display technology for conveying images to a user of the information processing system 100. A display device can include, according to certain embodiments, touch screen technology, e.g., a touch-screen display, which also serves as a user input interface 112 for detecting user input (e.g., touch of a user's finger). A display device, according to certain embodiments, comprises a graphical user interface (GUI). One or more speakers in the user output interface 110 can provide audible information to the user, and one or more indicators can provide indication of certain conditions of the system 100 to the user. The indicators can be visible, audible, or tactile, thereby providing necessary indication information to the user of the information processing system 100.

The user input interface 112 may include one or more keyboards, keypads, mouse input device, track pad, and other similar user input devices. A microphone is included in the user input interface 112, according to various embodiments, as an audio input device that can receive audible signals from a user. The audible signals can be digitized and processed by audio processing circuits and coupled to the processor/controller 102 for voice recognition applications such as for the information processing system 100 to receive data and commands as user input from a user.

The processor/controller 102 is communicatively coupled with a rules repository 114 which stores a set of predefined rules that can be used by the information processing system 100 during automatic generation of meaningful documentation for one or more source code files. The use of this rules repository 114 and various examples of rules will be discussed in more detail below.

The processor/controller 102 is communicatively coupled with a source code artifact (SCA) documentation repository 116. The SCA documentation repository 116 may comprise persistent non-volatile memory that can permanently store source code artifact documentation for one or more applications. The SCA documentation may include, according to one embodiment, a collection of documentation files associated with source code files that describe the structure, function, and features, of the source code artifact contained in the source code files.

The processor/controller 102 is communicatively coupled with a source code model repository 118. The source code model repository 118 may comprise persistent non-volatile memory that can permanently store a collection of source code models that are associated with source code artifact files. The source code model is an abstract and detailed model of the corresponding source code artifact. This model captures the key features of the source code including, for example, the set of operators, the connections between operators, the schema of the stream connections, and comments, if any, provided by the programmer.

The processor/controller 102 is communicatively coupled with a source code cache memory 120 that allows the processor/controller 102 to cache store in the memory 120 at least one or more of the following: source code artifacts, source code models, SCA documentation, and related information for one or more source code files being processed by the information processing system 100, as will be discussed in more detail below.

One or more input/output interface modules 122 are communicatively coupled with the processor/controller 102. In this way, the information processing system 100 is able to communicate with other systems and devices. For example, the processor/controller 102 is communicatively coupled with interface module(s) 122 that communicatively couple the information processing system 100 with external networks 124 and with a media reader/writer 126. The media reader/writer 126 can interoperate with the processor/controller 102 to read and write machine (computer) readable media 128 that may be communicatively coupled with the media reader/writer 126. Machine readable media 128, which are a form of computer readable storage medium, may be coupled with the media reader/writer 126 to provide information via the input/output interface module 122 to the processor/controller 102 of the information processing system 100. For example, data and instructions for the processor/controller 102 may be provided via the machine readable media 128.

As shown in FIG. 1, the Document Generator for Streams Code (DGSC) information processing system 100, according to the present example, receives one or more Streams source code modules, and optionally various metadata about the Streams operators and coding patterns, and produces a set of SCA documentation describing the source code artifact of these streams source code modules. A document generation process, according to the present example, is driven by the DGSC Driver 130 interoperating with the processor/controller 102. A streams compiler 132 is stored in the non-volatile memory 106 and can interoperate with the processor/controller 102 to parse, compile, and translate one or more source code artifacts into source code artifact models that can be stored in the source code model repository 118.

A document indexer 134, according to the present example, is stored in the non-volatile memory 106 and can interoperate with the processor/controller 102 to index SCA documentation associated with source code artifacts translated into source code artifact models stored in the source code model repository 118. A SCA documentation generator 136 is stored in the non-volatile memory 106 and can interoperate with the processor/controller 102 to analyze at least one SCA and to automatically, and without human intervention, generate SCA documentation for the at least one SCA.

According to various embodiments, the SCA documentation generator 136 automatically generates abstract SCA documentation in a form represented using the Darwin Information Typing Architecture (DITA) standard. A document translator 138 can interoperate with the processor/controller 102 to translate the SCA documentation from DITA form to a format that may be read by a user, such as HTML or PDF.

A documentation harvester 140 is stored in the non-volatile memory 106 and can interoperate with the processor/controller 102 to acquire (e.g., harvest, derive, and extract) documentation and comments from other source code artifact modules that may be related to the present SCA module being enhanced with new added documentation. This process will be discussed in more detail below.

Referring to FIG. 2, a more detailed view of an example of the rules repository 114 is shown. The rules repository 114 can include one or more of the following predefined rules, which are listed for illustration purposes only, and not for limitation. The rules repository 114 can store stream language rules 202, operator properties rules 204, application pattern specification rules 206, matching compatible input and output rules 208, function invocations and function definitions rules 210, object references and object definitions rules 212, class references and class definitions rules 214, and tokens names rules 216.

With referring to FIGS. 3 to 10, an example of a process followed by the DGSC information processing system 100 of FIG. 1 will be illustrated below. FIG. 3 shows a sparsely, if at all, commented source code module labeled TradeAggregator 302, which is received by the information processing system 100. The processor/controller 102 interoperates with the DGSC Driver 130 and with the streams compiler 132 to analyze, parse, compile, and translate, the received source code module 302 and creates a source code model therefor. The processor/controller 102 determines that the source code module 302, as received, includes no comments. It should be understood that while reference to the processor/controller 102 interoperating with the DGSC Driver 130 is not expressed in all instances, the DGSC Driver 130 invokes the various functional components of the DGSC information processing system 100 during the process discussed in the present example.

Figure 4:
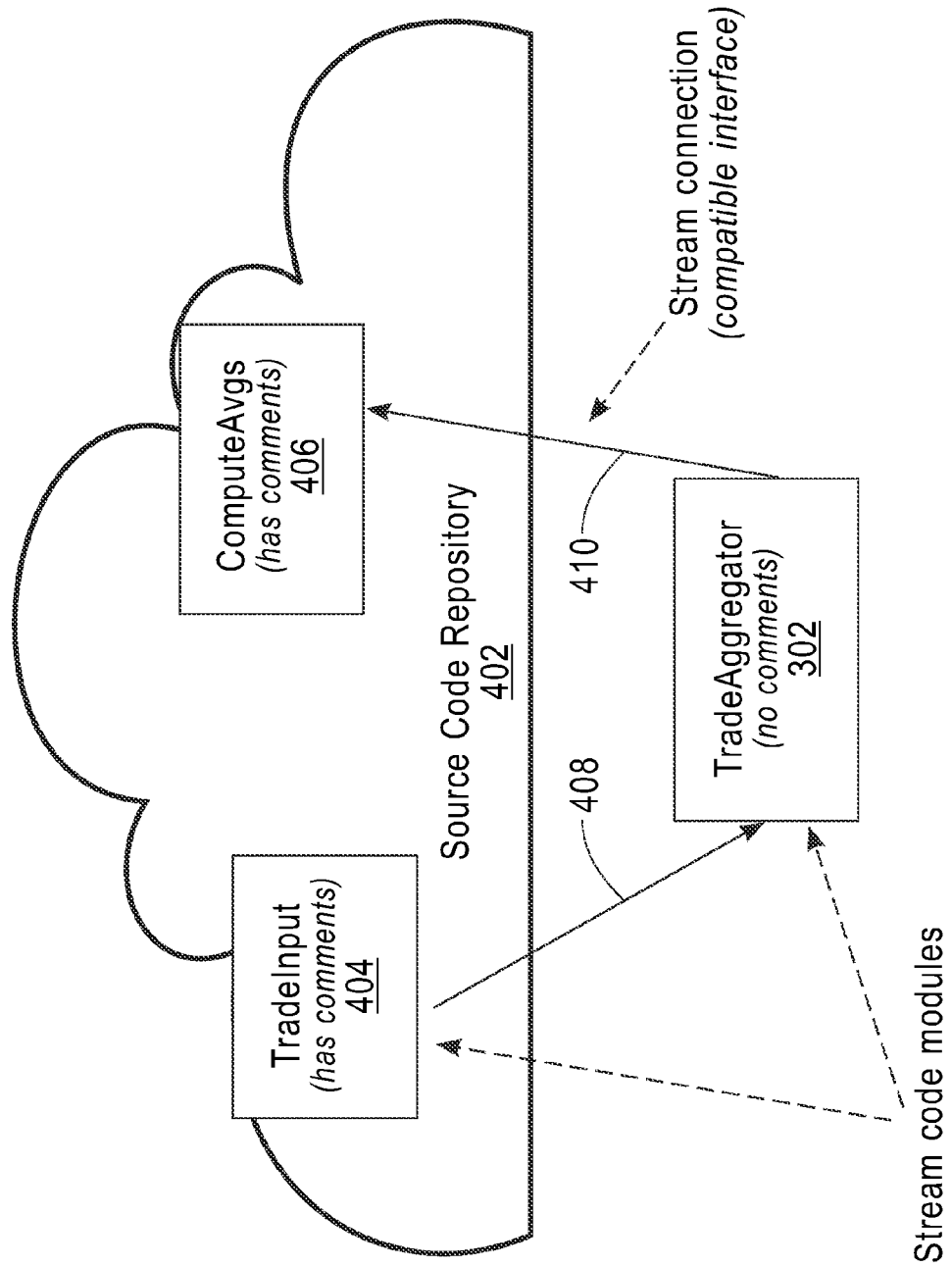
FIG. 4 is a block diagram illustrating examples of two source code modules stored in a source code repository, the modules including comments, and showing the example source code module of FIG. 3 being related to the two source code modules by compatible streams connections.

Referring to FIG. 4, an example of a source code model repository (or also referred to in this example as "source code repository") 402 stores one or more source code files (which may be stored as source code models) that are accessible to the information processing system 100. In the present example, a document indexer 134 indexes SCA documentation associated with source code artifacts translated into source code artifact models and that may be stored in the source code model repository 402.

The source code model repository 402, in this example, includes a source code file labeled TradeInput 404 which is well commented. Additionally, the source code repository 402 includes a source code file labeled ComputeAvgs 406 which is also well commented. These source code modules, i.e., Trade Aggregator 302, Trade Input 404, and ComputeAvgs 406 are Stream code modules that can be connected with each other by compatible interfaces such as by input connection 408 and output connection 410, to create a Stream application for running on a processing system. According to the present example, the Stream connections 408, 410, are normally provided through compatible interfaces between two or more Stream code modules. Other programming languages may utilize different mechanisms, or different naming conventions, for the similar concept of compatible interfaces. Therefore, while the present example discusses using Streams connections for compatible interfaces between software modules, it should be clear that there are many other analogous ways to provide compatible interfaces between software modules that will similarly be applicable in an embodiment of the present invention. As illustrated in FIG. 4, the TradeInput source code module 404 includes source code artifacts that can be used to produce input to the TradeAggregator module 302. This is via a Stream connection 408. The ComputeAvgs module 406, as illustrated in FIG. 4, shares a Stream connection 410 with the TradeAggregator module 302 and includes code that consumes one of the outputs from the TradeAggregator module 302.

According to the present example, with reference to FIG. 5, the documentation harvester 140 interoperates with the processor/controller 102 to harvest, derive, and extract (i.e., any one or a combination thereof) documentation and comments from the source code artifacts documentation in the Tradeinput module 404 that produces input into the TradeAggregator module 302. This documentation and comments, according to various embodiment, is relevant to a description of at least one of structure, function, and features of the source code artifacts. According to various embodiments, the processor/controller 102 caches the harvested, derived, and extracted SCA documentation as one or more tuples that include at least one language feature which is a subject of the documentation and the documentation content related to the SCA of the Trade Aggregator 302. The processor/controller 102, according to various embodiments, scores and ranks the cached SCA documentation tuples with respect to properties that include, but are not limited to, completeness, correctness, and currentness.

The comments 502, 504, from the TradeInput source code module 404, for example, can be any one or more of harvested, derived, and extracted such that they can be combined and merged in the sparsely commented TradeAggregator source code module 302. In similar fashion, with reference to FIG. 6, for example, comments 602, 604 can be any one or more of harvested, derived, and extracted from the ComputeAvgs source code module 406 that consumes one of the outputs from the TradeAggregator source code module 302 via a stream connection 410. This documentation and comments, according to various embodiment, is relevant to a description of at least one of structure, function, and features of the source code artifacts. These comments 602, 604 from the ComputeAvgs source code module 406 can be combined and merged in the sparsely commented TradeAggregator source code module 302.

Referring to FIG. 7, the harvested, derived, and extracted comments from the TradeInput source code module 404 and from the ComputeAvgs source code module 406 can be combined and merged into the TradeAggregator source code module 302 as shown. The first set of comments 702 are derived from the Tradeinput source code module 404. A second set of comments 706 can be harvested, derived, and extracted from the ComputeAvgs source code module 406 and combined and merged with the TradeAggregator source code module 302 as shown.

According to various embodiments, the new human readable and meaningful documentation 702, 706, that describes the SCA of the TradeAggregator source code module 302, is generated by the processor/controller 102 based at least on scoring and ranking of cached SCA documentation tuples. That is, the processor/controller 102 caches the harvested, derived, and extracted SCA documentation as one or more tuples that include at least one language feature which is the subject of the documentation and the documentation content related to the SCA of the TradeAggregator 302. The processor/controller 102, according to various embodiments, scores and ranks the cached SCA documentation tuples with respect to properties that include, but are not limited to, completeness, correctness, and currentness. As one example, and not for limitation, at least one highest scored and ranked cached SCA documentation tuple can be selected by the processor/controller 102 to generate the new human readable and meaningful documentation as SCA documentation that describes the SCA of the TradeAggregator source code module 302, which was previously missing therefrom. Other mechanisms (and other selection criteria) for selecting one or more cached SCA documentation tuples to generate the new human readable and meaningful documentation may be used, according to various embodiments of the present invention.

In the present example, the exported operator labeled QuoteFilter 704 in the TradeAggregator source code module 302 remains undocumented. This is due, in part, because the programmer provided no comments for this operator 704, and the operator 704 is not connected via a Stream connection with any other source code module that can be located by the information processing system 100 in the source code repository 402.

Figure 8:
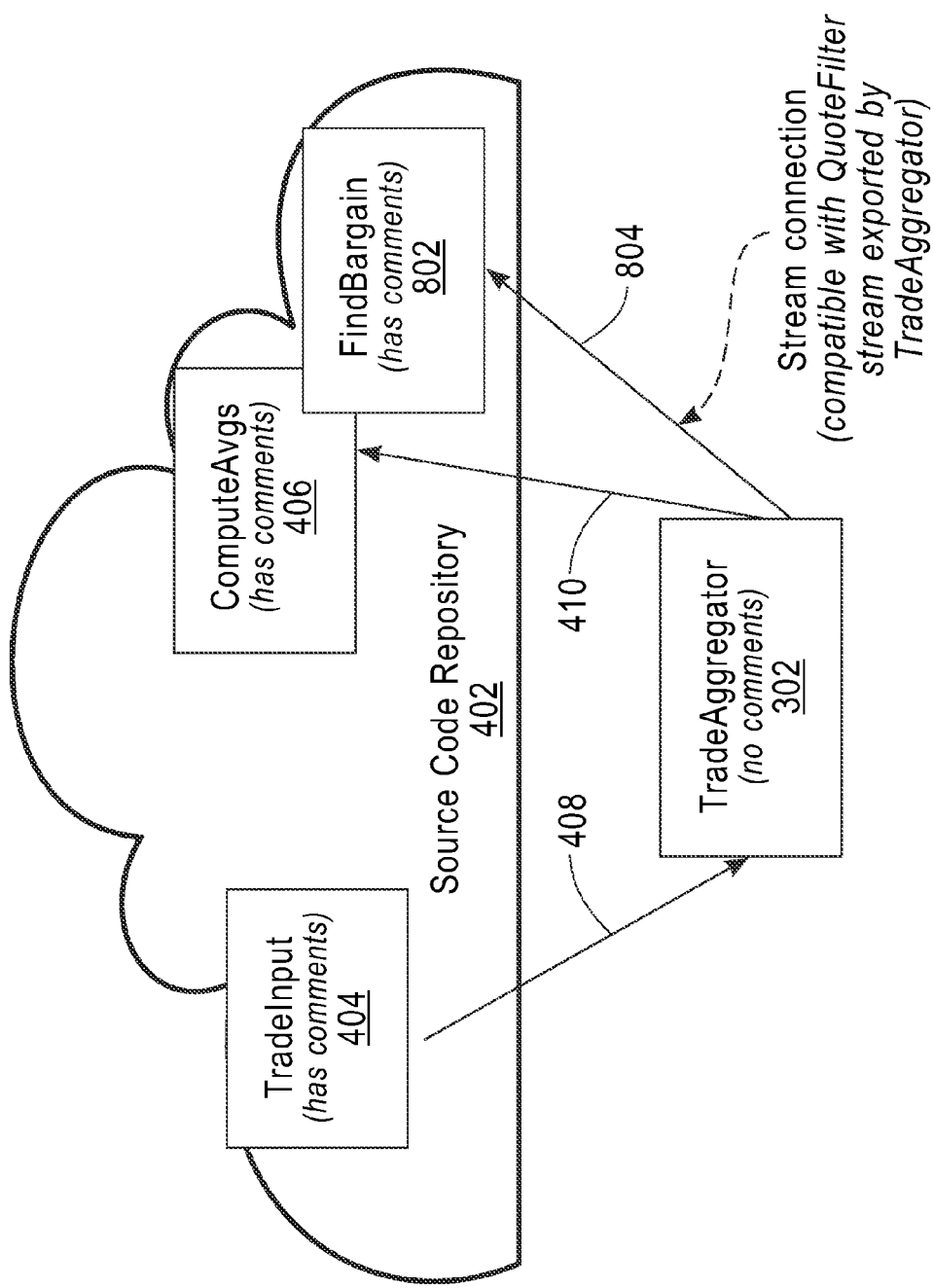
FIG. 8 is a block diagram illustrating the source code repository of FIG. 4 with a newly added source code module that includes comments and that is related to the source code module of FIG. 3 by a compatible stream connection.

Referring to FIG. 8, a new source code module labeled FindBargain 802 is shown added to the source code repository 402. This FindBargain source code module 802 is well commented. The documentation harvester 140 interoperating with the processor/controller 102 can harvest, derive, and extract documentation and comments from the source code artifacts in the FindBargain source code module 802 to add documentation and comments to the TradeAggregator source code module 302 which shares a Stream connection 804 with the FindBargain source code module 802. This Stream connection 804 shares the compatible interface with the QuoteFilter Stream operator that is exported by the TradeAggregator source code module 302.

Referring to FIG. 9, the FindBargain source code module 802 includes comments 902 associated with the QuoteFilter Streams connection operator that consumes one of the outputs from the TradeAggregator source code module 302. The documentation harvester 140 interoperating with the processor/controller 102 can harvest, derive, and extract these comments 902 from the FindBargain source code module 802 and combine and merge such comments into the TradeAggregator source code module 302 as illustrated in FIG. 10. The comments 1002 added to the TradeAggregator source code module 302 have been harvested, derived, and extracted from the FindBargain source code module 802. In this way, the DGSC information processing system 100, according to the present example, can add new documentation and comments to the previously sparse, if at all, commented TradeAggregator source code module 302, thereby improving and enhancing the TradeAggregator source code module 302 with added readable and meaningful comments 702, 706, 1002 and documentation.

The improved and enhanced documentation for the TradeAggregator source code module 302 provides meaningful information to a user/programmer to help understand the functions and features of the application. This added information in the documentation of the application provides valuable information to a programmer or user of the application to help at least analyze, modify, and use the application.

Figure 11:
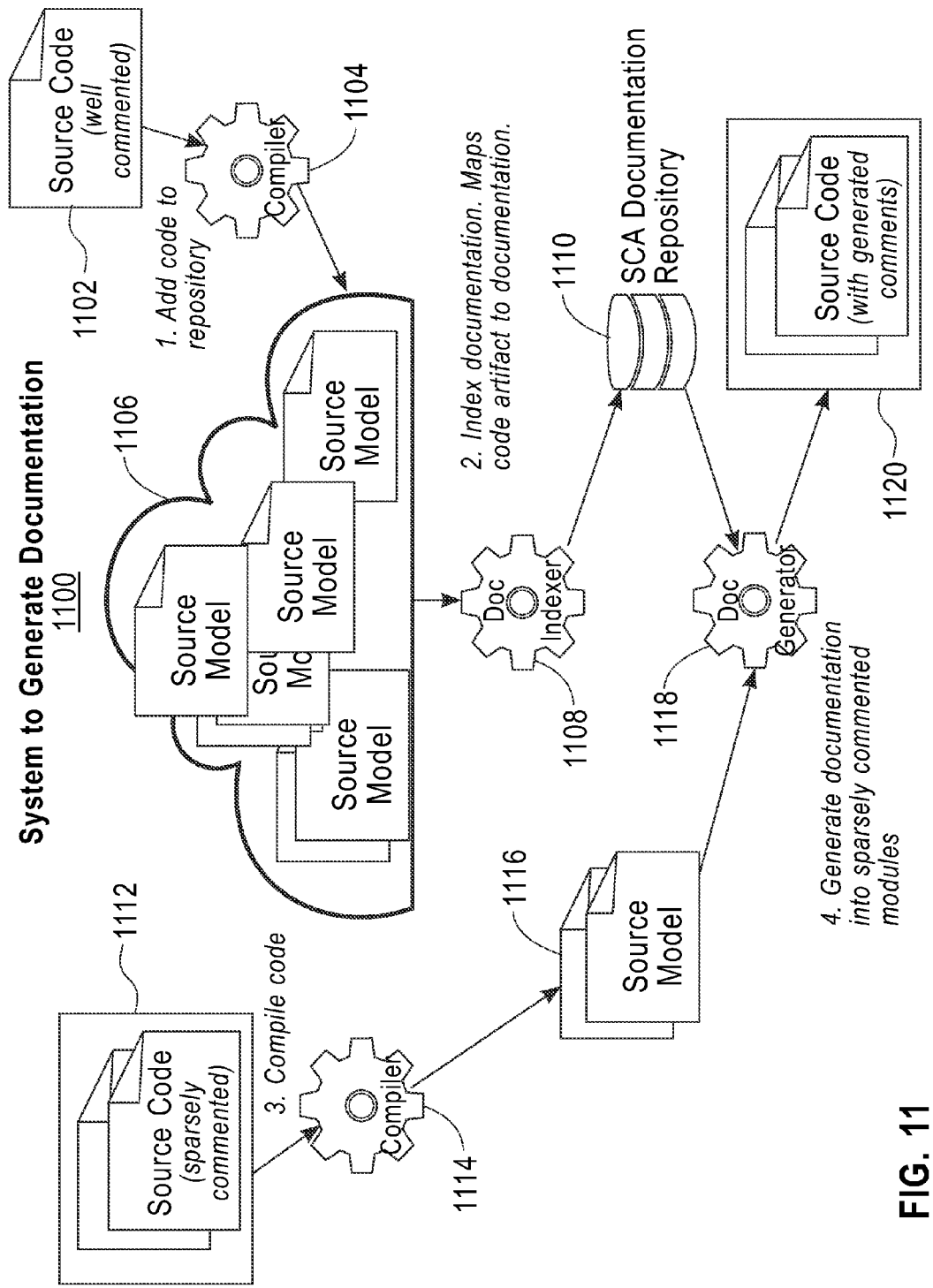
FIG. 11 is a data flow diagram illustrating an example information processing system that generates documentation, according to one embodiment of the present disclosure.

Referring to FIG. 11, an example of an information processing system 1100 to generate documentation for a sparsely commented source code module is shown. The system 1100 receives source code modules 1102 that are well commented. A compiler 1104 automatically, and without human intervention, compiles these source code modules 1102 into source code models that are added to a source code repository 1106. Additionally, a document indexer 1108 indexes the SCA documentation associated with the source code model stored in the source code repository 1106 and maps source code artifacts to associated SCA documentation. In the present example, the source code artifact documentation is stored in a source code artifact documentation repository 1110.

When a sparsely commented source code module 1112 is received by the system 1100 a compiler 1114 automatically (and without human intervention) compiles this source code module 1112 and determines that it is sparsely commented. The compiler 1114 translates the sparsely commented source code module 1112 into a source code model 1116.

A documentation generator 1118 analyzes and evaluates the source code model 1116 to generate documentation and comments into the source code model 1116 and the associated SCA documentation. The source code model 1116 is analyzed and evaluated with reference to related meta data, related pre-existing source code models stored in the source code repository 1106, related SCA documentation stored in the SCA documentation repository 1110, and a set of pre-define rules stored in a rules repository. Based on the analysis and evaluation, the documentation generator 1118 generates documentation and comments and combines and merges the documentation and comments into the source code model 1116 and associated SCA documentation. A resulting source code module 1120 includes the newly generated documentation and comments thereby providing an improved and enhanced source code module 1120 that includes human readable and meaningful comments that describe the structure, function, and features of the source code artifacts contained in the source code module 1120.

Figure 12:
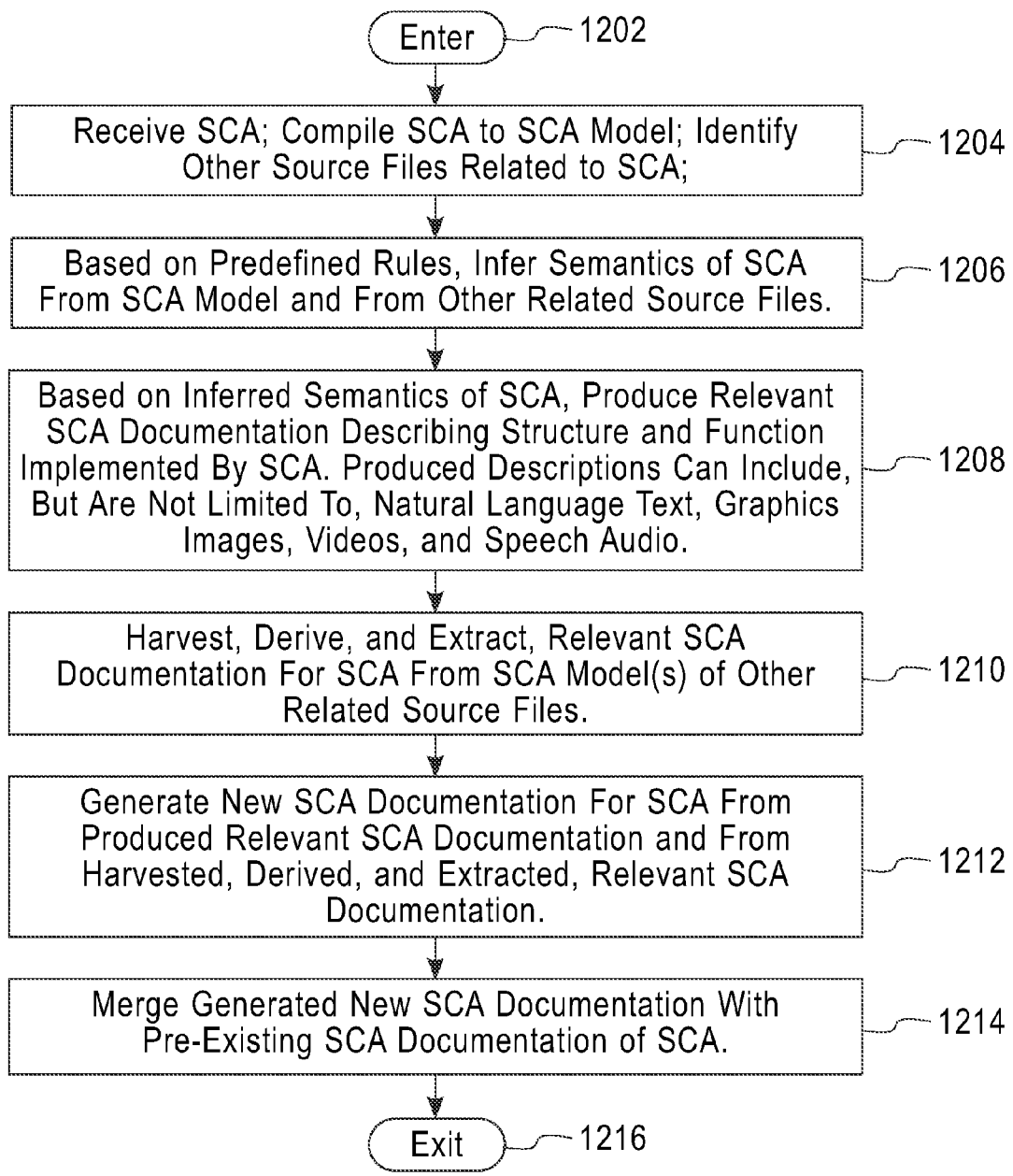
FIG. 12 is an operational flow diagram illustrating one example process followed by a processor of the information processing system of FIG. 1, according to one embodiment of the present disclosure.

Referring now to FIG. 12, the flow diagram illustrates the architecture, functionality, and operation of possible implementations of systems, methods, and computer program products according to various embodiments herein. In this regard, each block in the flow diagram may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently (or contemporaneously), or the blocks may sometimes be executed in the reverse order, depending upon the functionality involved. It will also be noted that each block of the flow diagram illustration, and combinations of blocks in the flow diagram, can be implemented by special purpose hardware-based systems that perform the specified functions or acts, or combinations of special purpose hardware and computer instructions.

FIG. 12 illustrates one example of an operational sequence for the information processing system 100 illustrated in FIG. 1. It is assumed before entering the operational sequence that a programmer has implemented an application and provided comments about the implementation in source code artifacts documentation stored in the source code artifact documentation repository 116. Additionally, the programmer and/or an application system administrator has provided rules in the rules repository 114. Each of these rules can be used by the information processing system 100 to analyze and evaluate SCA and SCA documentation and to generate new SCA documentation for one or more SCA modules. An example of several rules 202, 204, 206, 208, 210, 212, 214, 216, that might be stored in the rules repository 114 is provided in FIG. 2, and has been discussed above. Additionally, it is assumed that a user or programmer has submitted one or more source code modules to the information processing system 100 to be improved and enhanced with new generated documentation and comments.

Referring to FIG. 12, the processor/controller 102 enters, at step 1202, the operational sequence and then proceeds, at step 1204, to receive one or more source code files that contain source code artifacts (SCA). The processor/controller 102 interoperates with the Streams compiler 132 to automatically compile the source code artifacts and translate them to a source code artifact model that is stored in a source code model repository 118. The Streams compiler 132 additionally identifies other source files, if any, that are related to the source code artifacts translated into the source code artifact model. The compiler 132 translates the streams source code to an abstract and detailed model of the code This source code model captures the key features of the streams code including the set of operators, the connections between operators, the schema of the stream connections, and comments, if any, typically provided by a programmer.

The rules stored in the rules repository 114 are used by the SCA Documentation Generator 136 interoperating with the processor/controller 102 to analyze and evaluate the SCA and the related SCA model, at step 1206. The SCA Documentation Generator 136, at step 1206, based on the set of predefined rules in the rules repository 114, analyzes and evaluates the SCA, and infers semantics of the SCA from the SCA model and from other related source files. The inferred semantics at least indicating description of at least one of structure, function, and features, of the SCA.

Based on the inferred semantics of the SCA, at step 1208, the SCA documentation generator 136 produces relevant SCA documentation describing one or more of structure, features, and function, implemented by the SCA. The produced descriptions, according to the present example, can include, but are not limited to, natural language text, graphics images, videos, and speech audio. The SCA documentation generator 136, according to the present example, parses the SCA model, identifies source code features not documented by the programmer, and using the meta data from the model in conjunction with the set of rules in the rules repository 114, generates text comments that describe the source code. For example, given a specification of an operator where the programmer did not provide a comment that describes the input ports, the SCA documentation generator 136 will extract the input port properties from the SCA model and produce text such as: "This operator must be configured with two input ports and one output port."

At step 1210, the documentation harvester 140 interoperates with the processor/controller 102 and, based at least on the inferred semantics, one or more of harvests, derives, and extracts, relevant SCA documentation for the SCA from the source code models and the SCA documentation of the other related source code files. This harvested, derived, and extracted relevant SCA documentation is determined to be related to the SCA. These other related SCA models are stored in the source code model repository 118 and the associated and indexed SCA documentation is stored in the SCA documentation repository 116. The harvested, derived, and extracted descriptions, according to the present example, can include, but are not limited to, natural language text, graphics images, videos, and speech audio.

At step 1212, the SCA documentation generator 136 automatically generates new SCA documentation for the SCA in the SCA model based on the produced relevant SCA documentation and based on the acquired (i.e., at least one of harvested, derived, and extracted) relevant SCA documentation. This generated new SCA documentation may include, but is not limited to, comments with sentences that describe the undocumented source code. This generated new SCA documentation for the SCA describes at least one of structure, function, and features, of the SCA, where such generated new SCA documentation was previously missing from the SCA and any associated SCA documentation.

The SCA documentation generator 136, at step 1214, combines and merges the generated new SCA documentation with pre-existing SCA documentation of the SCA. According to one embodiment of the present invention, the resulting combined and merged SCA documentation of the SCA is stored in an intermediate format (e.g., using the DITA standard) that is associated with the SCA model stored in the source code model repository 118. However, a document translator 138 interoperates with the processor/controller 102 to translate and convert this intermediate format documentation into a user readable and meaningful documentation that can be stored in a more usable format. The document translator 138, for example, may produce the documentation and comments in various formats, including, but not limited to, HTML, PDF, or ASCII text.

For example, text comments can be stored in a PDF file or an ASCII file format. Any graphics images or videos may be stored in usable file format (e.g., JPEG, MPEG, and the like) for the user of the system 100. Speech audio may be stored in a WAVE file format, RIFF file format, or in another compatible audio format usable by the user of the information processing system 100. With the new SCA documentation associated with the SCA, the one or more SCA modules have been improved and enhanced with new human readable and meaningful documentation that was previously missing from the SCA and any associated SCA documentation. The processor/controller 102 then exits the operational sequence, at step 1216.

As will be appreciated by one of ordinary skill in the art, aspects of the various examples may be embodied as a system, method, or computer program product. Accordingly, examples herein may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, aspects herein may take the form of a computer program product embodied in one or more computer readable media having computer readable program code embodied thereon.

Any combination of one or more computer readable media may be utilized. A computer readable medium may be a computer readable signal medium or alternatively a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electrical, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including streams programming language such as IBM's Streams Processing Language, object oriented languages such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer, and partly on a remote computer or entirely on the remote computer. The remote computer, according to various embodiments, may comprise one or more servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to various embodiments of the disclosure. It will be understood that one or more blocks of the flowchart illustrations and/or block diagrams, and combinations of blocks in the flowchart illustrations and/or block diagrams, can be implemented by computer program instructions. These computer program instructions may be provided to one or more processors, to a special purpose computer, or to other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. Instructions stored in a computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In accordance with various embodiments, the methods described herein are intended for operation as software programs running on a computer processor. Furthermore, software implementations can include, but are not limited to, distributed processing or component/object distributed processing, parallel processing, or virtual machine processing and can also be constructed to implement the methods described herein.

While the computer readable storage medium 226 is shown in an example embodiment to be a single medium, the term "computer readable storage medium" should be taken to include a single medium or multiple media (e.g., a centralized or distributed database, and/or associated caches and servers) that store the one or more sets of instructions. The term "computer-readable storage medium" shall also be taken to include any non-transitory medium that is capable of storing or encoding a set of instructions for execution by the machine and that cause the machine to perform any one or more of the methods of the subject disclosure.

The term "computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a computer-readable storage medium, as listed herein and including art-recognized equivalents and successor media, in which the software implementations herein are stored.

Although the present specification may describe components and functions implemented in the embodiments with reference to particular standards and protocols, the disclosure is not limited to such standards and protocols. Each of the standards represent examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor 102 is illustrated for information processing system 100, information processing systems with multiple CPUs or processors can be used equally effectively. Various embodiments of the present disclosure can further incorporate interfaces that each includes separate, fully programmed microprocessors that are used to off-load processing from the processor 102. An operating system (not shown) included in main memory for the information processing system 100 is a suitable multitasking and/or multi-processing operating system, such as, but not limited to, any of the Linux, UNIX, Windows, and Windows Server based operating systems. Various embodiments of the present disclosure are able to use any other suitable operating system. Some embodiments of the present disclosure utilize architectures, such as an object oriented framework mechanism, that allows instructions of the components of operating system (not shown) to be executed on any processor located within the information processing system. The input/output interface module(s) 122 can be used to provide an interface to at least one network 124. Various embodiments of the present disclosure are able to be adapted to work with any data communications connections including present day analog and/or digital techniques or via a future networking mechanism.

Although the illustrative embodiments of the present disclosure are described in the context of a fully functional computer system, those of ordinary skill in the art will appreciate that various embodiments are capable of being distributed as a computer program product via CD or DVD, e.g. CD, CD ROM, or other form of recordable media, or via any type of electronic transmission mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The terms "source code artifact" and "SCA" are intended to broadly mean a set of source code. The source code may be implemented in a programming language, like IBM's Streams Processing Language. The set of source code may be, but is not limited to, source code that is used to implement a Streams operator, function, or type.

The terms "source code artifact documentation" and "SCA documentation" are intended to broadly mean the comments authored by a programmer, by another person, or by an information processing system, which are associated with a source code artifact. As an example, and not for limitation, see the comments below:

```
/**
* Given an input stream, this operator filters out the bad data, and outputs
* only the good data.
*/
composite Filter (InputStream in, OutputStream out) {
    // code not shown
}
```
By way of example, this disclosure would supplement the above comment authored by the programmer with information on the application's runtime behavior:
```
/**
* Given an input stream, this operator filters out the bad data, and outputs
* only the good idea.
*
* Maximum input rate: 2M messages / sec, 50Mb / sec
* Maximum output rate: 2M messages / sec 50Mb / sec
* Maximum duration: 57 hours, 12 minutes, 11 seconds
* Adjacent upstream FileSource 50%. Functor 20%, other 30%
* Adjacent downstream Split 80%, Barrier 10%. other 10%
*
*/
composite Filter (InputStream in, OutputStream out) {
    // code not shown
}
```

The term "human readable and meaningful documentation" is intended to broadly mean all forms of documentation that are perceivable by, and that convey meaning to, a human in the context of describing one or more source code artifacts. These descriptions of source code artifacts, for example can include, but are not limited to, natural language text (e.g., text comments), graphics images, videos, speech audio (e.g., audible comments), and other forms of audio.

The term "human readable and meaningful comments" is intended to broadly mean those forms of "human readable and meaningful documentation" that can be expressed as comments, and particularly in which the descriptions of source code artifacts can include, but are not limited to, natural language text (e.g., text comments), speech audio (e.g., audible comments), and the like.

The term "job" is intended to broadly mean an executable instance of an application, such as a Streams Processing Language application.

The term "dynamic connection updates" is intended to broadly mean changing an operator, as used in a streams processing language and the like, that terminates the beginning or end of a stream connection while the application is executing. This includes creating a new connection between operators.

The terms "Streams Processing Language" and "SPL" are intended to broadly mean a programming language that specifies a set of operators and the communication connections (i.e. streams) between the operators. For example, IBM's Streams Processing Language may be used in connection with code for an application to execute on one of IBM's InfoSphere Streams products. An embodiment of this disclosure may, but is not limited to, use an application coded using an SPL.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope and spirit of the examples presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. A method, with a processor of an information processing system, for automatically generating human readable and meaningful documentation for one or more source code files, comprising:

receiving one or more source code files containing at least source code artifacts (first SCA);

inferring semantics, with a processor of an information processing system, from at least the first SCA based on predefined rules, the inferred semantics at least indicating description of at least one of structure, function, and features, of the first SCA;

automatically generating, with the processor and based at least on the inferred semantics, new human readable and meaningful documentation as new SCA documentation that describes at least one of structure, function, and features of the first SCA, and that such new SCA documentation is previously missing from the first SCA and any associated SCA documentation; and storing the generated new human readable and meaningful documentation associated with the first SCA as SCA documentation for the first SCA, and wherein the inferring semantics further comprises:

compiling the received one or more source code files into one or more source code models, the compiled one or more source code models capturing at least key language features of the first SCA and any associated SCA documentation.

2. The method of claim 1, further comprising:
at least one of combining and merging the generated new human readable and meaningful documentation associated with the first SCA as SCA documentation included with the first SCA in one or more source code files.

3. The method of claim 1, further comprising:
identifying, based at least on the inferred semantics, at least one source code model stored in a source code model repository, the at least one source code model including SCA of at least one other source code file related to the first SCA and being associated with second SCA documentation; and acquiring, based at least on the inferred semantics, at least a portion of the second SCA documentation that is relevant to a description of at least one of structure, function, and features, of the first SCA; and wherein the generating comprises:

generating, with the processor, new human readable and meaningful documentation as SCA documentation that describes the first SCA, based at least on the acquired relevant at least a portion of the second SCA documentation.

4. The method of claim 3, wherein the acquiring comprises one or more of
harvesting, deriving, and extracting, the at least a portion of the second SCA documentation that is relevant to a description of at least one of structure, function, and features, of the first SCA.

5. The method of claim 3, wherein the acquiring comprises extracting at least a portion of the second SCA documentation related to the first SCA, the source code model repository storing a plurality of source code models for a plurality of other source code files.

6. The method of claim 5, wherein the extracting comprises:
caching the extracted at least a portion of the second SCA documentation as a tuple that includes at least one language feature that's a subject of the documentation and the documentation content related to the first SCA.

7. The method of claim 1, wherein the compiling comprises automatically, with the processor and without human intervention, compiling the received one or more source code files into the one or more source code models.

8. The method of claim 1, wherein the inferring semantics further comprises:
analyzing the first SCA using the predefined rules to evaluate at least the language features specified in the one or more source code models to produce description of at least one of structure, function, and features, of the first SCA.

9. The method of claim 8, wherein the predefined rules include one or more of the following:
a stream language rule;
an operator properties rule;
an application pattern specification rules;
a matching compatible input and output rule;
a function invocation rule;
a function definition rule;
an object reference rule;
an object definition rule;
a class reference rule;
a class definition rule; and
a tokens names rule.

10. The method of claim 1, further comprising:
evaluating, based on a set of predefined rules, the one or more source code models and identifying at least one other source code file related to the first SCA, the at least one other source code file including second SCA and associated second SCA documentation that are separate and related to the first SCA, the set of predefined rules including at least matching on compatible inputs and outputs, function invocations and function definitions, object references and object definitions, class references and class definitions, and token names;

extracting SCA documentation from at least one source code model of the at least one other source code file related to the first SCA, the at least one source code model being stored in a source code model repository storing a plurality of source code models for a plurality of other source code files;

caching the extracted SCA documentation as one or more tuples that include at least one language feature that's a subject of the documentation and the documentation content related to the first SCA;

scoring and ranking the cached SCA documentation tuples with respect to properties that include, but are not limited to, completeness, correctness, and currentness; and wherein the generating comprises:
generating, with the processor, new human readable and meaningful documentation as SCA documentation that describes the first SCA, based at least on the scoring and ranking of the cached SCA documentation tuples.

11. The method of claim 10, further comprising:
selecting at least one highest scored and ranked cached SCA documentation tuple; and
wherein the generating comprises:
generating, with the processor, new human readable and meaningful documentation as SCA documentation that describes the first SCA from extracted SCA documentation, based at least on the selected cached SCA documentation tuple.

12. The method of claim 11, further comprising:
at least one of combining and merging the generated new human readable and meaningful documentation of the first SCA as SCA documentation included with the first SCA in one or more source code files.

13. An information processing system comprising:
memory;
a rules repository for storing predefined rules relating to at least one of structure, function, and features, of a set of source code artifacts; and
a processor communicatively coupled to the memory and the rules repository, wherein the processor, responsive to executing computer instructions, performs operations comprising:
 receiving one or more source code files containing at least source code artifacts (first SCA);
 inferring semantics, with the processor, from at least the first SCA based on the predefined rules, the inferred semantics at least indicating description of at least one of structure, function, and features, of the first SCA;
 compiling the received one or more source code files into one or more source code models, the compiled one or more source code models capturing at least key language features of the first SCA and any associated SCA documentation;
 automatically generating, with the processor and based at least on the inferred semantics, new human readable and meaningful documentation as new SCA documentation that describes at least one of structure, function, and features of the first SCA, and that such new SCA documentation is previously missing from the first SCA and any associated SCA documentation; and
 storing the generated new human readable and meaningful documentation associated with the first SCA as SCA documentation included with the first SCA in one or more source code files.

14. The information processing system of claim 13, further comprising:
a source code model repository for storing source code models of source code files including at least source code artifacts and associated SCA documentation; and
an SCA documentation repository for storing SCA documentation associated with source code models stored in the source code model repository; and
wherein the processor, responsive to executing the computer instructions, performs operations comprising:
 identifying, with the processor, at least one other source code file related to the first SCA from at least one source code model stored in the source code model repository and with associated SCA documentation stored in the SCA documentation repository, the at least one other source code file including second SCA and associated second SCA documentation that are separate and related to the first SCA; and
 acquiring, based at least on the inferred semantics, at least a portion of the second SCA documentation from the at least one other source code file, wherein the acquired at least a second SCA documentation is relevant to a description of at least one of structure, function, and features, of the first SCA; and wherein the automatically generating comprises:
 generating, with the processor, new human readable and meaningful documentation as SCA documentation that describes the first SCA, based at least on the acquired relevant at least a portion of the second SCA documentation.

15. The information processing system of claim 14, wherein the acquiring comprises one or more of
harvesting, deriving, and extracting, the at least a portion of the second SCA documentation that is relevant to a description of at least one of structure, function, and features, of the first SCA, the at least a portion of the second SCA documentation being harvested, derived, and extracted from the SCA documentation repository and being associated with at least one source code model stored in the source code model repository.

16. The information processing system of claim 13, wherein the processor, responsive to executing computer instructions, performs operations comprising:
 evaluating, based on a set of predefined rules, the one or more source code models and identifying at least one other source code file related to the first SCA, the at least one other source code file including second SCA and associated second SCA documentation that are separate and related to the first SCA, the set of predefined rules including at least matching on compatible inputs and outputs, function invocations and function definitions, object references and object definitions, class references and class definitions, and token names;
 extracting SCA documentation from at least one source code model of the at least one other source code file related to the first SCA, the at least one source code model being stored in a source code model repository storing a plurality of source code models for a plurality of other source code files;
 caching the extracted SCA documentation as one or more tuples that include at least one language feature that's a subject of the documentation and the documentation content related to the first SCA;
 scoring and ranking the cached SCA documentation tuples with respect to properties that include, but are not limited to, completeness, correctness, and currentness; and
 wherein the generating comprises:
 generating, with the processor, new human readable and meaningful documentation as SCA documentation that describes the first SCA, based at least on the scoring and ranking of the cached SCA documentation tuples.

17. The information processing system of claim 16, wherein the processor, responsive to executing computer instructions, performs operations comprising:
 selecting at least one highest scored and ranked cached SCA documentation tuple; and
 wherein the generating comprises:
 generating, with the processor, new human readable and meaningful documentation as SCA documentation that describes the first SCA from extracted SCA documentation, based at least on the selected cached SCA documentation tuple.

18. A computer readable storage medium, comprising computer instructions which, responsive to being executed by a processor, cause the processor to perform operations comprising:
 receiving one or more source code files containing at least source code artifacts (first SCA);
 inferring semantics, with a processor of an information processing system, from at least the first SCA based on predefined rules, the inferred semantics at least indicating description of at least one of structure, function, and features, of the first SCA;

automatically generating, with the processor and based at least on the inferred semantics, new human readable and meaningful documentation as new SCA documentation that describes at least one of structure, function, and features of the first SCA, and that such new SCA documentation is previously missing from the first SCA and any associated SCA documentation; and storing the generated new human readable and meaningful documentation associated with the first SCA as SCA documentation for the first SCA, and wherein the inferring semantics further comprises:

compiling the received one or more source code files into one or more source code models, the compiled one or more source code models capturing at least key language features of the first SCA and any associated SCA documentation.

19. The computer readable storage medium of claim 18, comprising computer instructions which, responsive to being executed by the processor, cause the processor to perform operations comprising:

at least one of combining and merging the generated new human readable and meaningful documentation associated with the first SCA as SCA documentation included with the first SCA in one or more source code files.

20. The computer readable storage medium of claim 18, comprising computer instructions which, responsive to being executed by the processor, cause the processor to perform operations comprising:

identifying, with the processor, at least one other source code file related to the first SCA, the at least one other source code file including second SCA and associated second SCA documentation that are separate and related to the first SCA; and acquiring, based at least on the inferred semantics, at least a portion of the second SCA documentation that is relevant to a description of at least one of structure, function, and features, of the first SCA; and wherein the generating comprises:

generating, with the processor, new human readable and meaningful documentation as SCA documentation that describes the first SCA, based at least on the acquired relevant at least a portion of the second SCA documentation.

21. The computer readable storage medium of claim 20, wherein the acquiring comprises one or more of harvesting, deriving, and extracting, the at least a portion of the second SCA documentation that is relevant to a description of at least one of structure, function, and features, of the first SCA.

22. The computer readable storage medium of claim 20, wherein the acquiring comprises extracting SCA documentation from at least one source code model of the at least one other source code file related to the first SCA, the at least one source code model being stored in a source code model repository storing a plurality of source code models for a plurality of other source code files.

23. The computer readable storage medium of claim 22, wherein the extracting comprises:

caching the extracted SCA documentation as a tuple that includes at least one language feature that's a subject of the documentation and the documentation content related to the first SCA.

24. The computer readable storage medium of claim 18, wherein the compiling comprises automatically, with the processor and without human intervention, compiling the received one or more source code files into the one or more source code models.

\* \* \* \* \*